Figure 1:
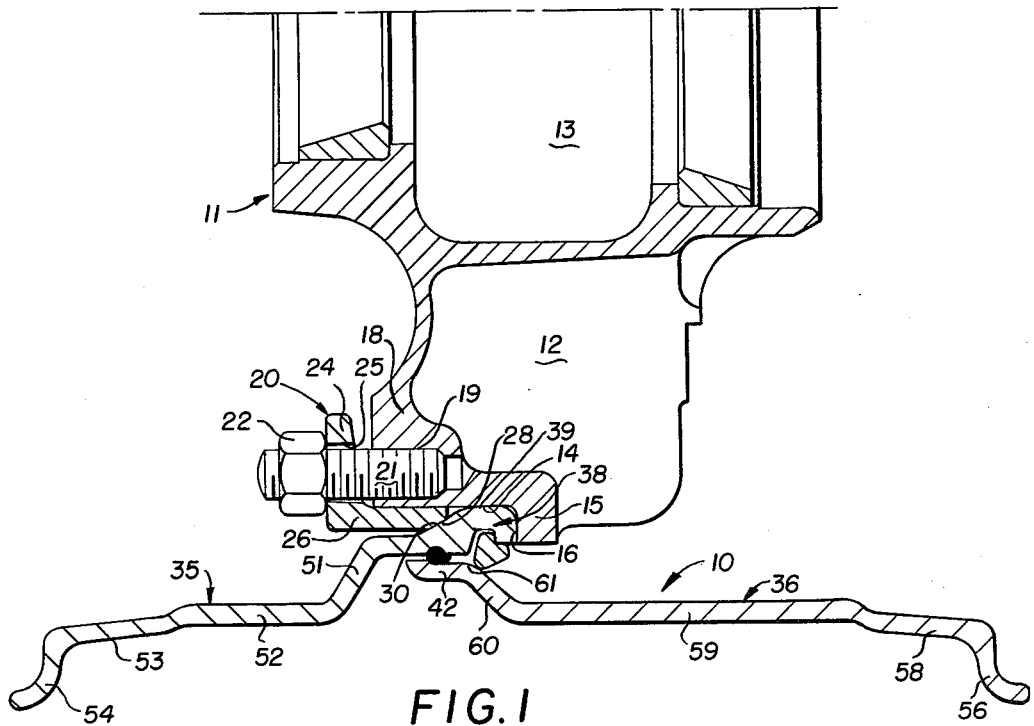

Dec. 28, 1965     D. A. WALTHER     3,225,426

METHOD OF MAKING A TWO PIECE WIDE BASE RIM

Filed May 9, 1962

INVENTOR.
DANIEL A. WALTHER
BY Hamilton & Cook
ATTORNEYS

United States Patent Office 3,225,426
Patented Dec. 28, 1965

---

3,225,426
METHOD OF MAKING A TWO PIECE WIDE BASE RIM
Daniel A. Walther, Dayton, Ohio, assignor to The Dayton Steel Foundry Company, Dayton, Ohio, a corporation of Ohio
Filed May 9, 1962, Ser. No. 193,535
4 Claims. (Cl. 29—159.1)

The present invention relates generally to rim construction. More particularly, the present invention relates to a two-piece rim especially adapted for mounting "wide bead" or "wide base" tires.

The relatively wide bead or wide base truck tires are generally known and referred to by the trade names "Duplex" or "Super Single" tires. The advantages claimed for such a tire include greater off-the-road and over-the-road stability for the vehicle, wider spring spacing, higher load carrying capacity, elimination of hazards originating from driving on duals when one tire is flat and reduction in inventory of spare tires.

The wide bead tires must be mounted on special rims measuring at least 11.25 inches in width from gutter flange to gutter flange. Because of this wide axial dimension required of a rim used about the wide bead tires, it is impossible to roll the mill stock to the proper cross-sectional shape or profile, cut into proper lengths and butt weld the ends together to form an integral rim. There are no rolling mills large enough to accommodate a section of such width. Accordingly, rims for wide bead tires have heretofore been rolled in either two or three sections which are welded together so that their composite width forms the width of the rim.

It is therefore an object of the present invention to provide a method of manufacturing rims for wide bead tires in existing rolling mills without the necessity of welding together sections to provide the composite width required to seat wide bead tires.

It is a further object of the present invention to provide a two-piece or split rim for accommodating wide bead tires.

It is a still further object of the present invention to provide a two-piece or split rim which can be used to mount tubeless wide bead tires.

It is a still further object of the present invention to provide a two-piece or split rim in which the interfitting interlocking of the parts occurs medially of the gutter flanges.

These and other objects which will become apparent in the following specification are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Figure 2:
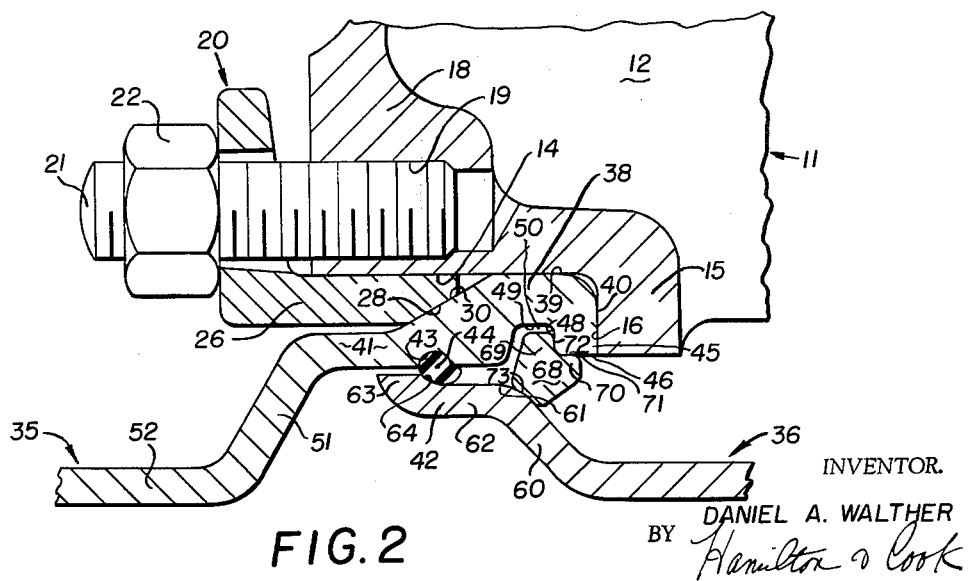

In the drawings:

FIG. 1 is a cross section of the rim embodying the concept of the present invention mounted on a wheel; and FIG. 2 is an enlarged fragmentary area of FIG. 1.

In general, a rim constructed according to the concept of the present invention comprises a base member and a ring member of substantially equal width. Each member has a peripheral bead seat flange on one edge. The other edge of the base member has a reduced diameter portion with special surfaces including a radially inner axially oriented surface for contacting the felly when mounted on a wheel, a radially inner axially inclined surface for wedging engagement by a clamp and a radially outer cylindrical surface. The other edge of the ring member has a reduced diameter portion for telescopically fitting over the reduced diameter portion of the base member. Thus telescopically interfitted, they are selectively locked together by a split, heart-shaped in cross section, locking ring which is wedgingly engaged between the telescoped edge portions of base and ring members. A sealing means may also be effectively retained between the telescoped edge portions of the base and ring members apart from the locking ring for mounting tubeless wide bead tires. The interfitting and locking of the base and ring members occurs substantially medially the gutter flanges of the rim to allow each of the rim members to be individually integrally formed from rolling stock and operatively joined together without the need for welding together members to constitute the effective width required for mounting wide bead tires.

Referring to the drawings, the improved rim for mounting wide bead tires is indicated generally by the numeral 10 and is mounted on the wheel 11 having any desired number of spoke members 12 extending radially outwardly from a conventional hub 13 and terminating at their outer end in a preferably accurately machined load-bearing felloe or "felly" surface 14. The axially inner end of each relatively narrow felly surface 14 is terminated abruptly by a radially outwardly directed flange 15. The axially outer face 16 of said flange 15 is accurately machined to provide a positive stop or orienting surface for the rim 10. The surface 16 is preferably oriented substantially perpendicularly to the rotational axis of the wheel 11; for example, at an angle of 80° to 90° substantially as shown.

At the axially outer end of each felly surface 14 the spoke members 12 are each provided with a boss 18 having a threaded bore 19 for attachment of the clamp lug 20, as by a stud bolt 21 and a nut 22.

Each clamp lug 20 has a radially directed upright leg 24 with a bore or slot 25 to receive the supporting bolt 21. Each clamp lug 20 also has an axially directed horizontal leg 26. The axially directed leg 26 extends axially inwardly and is slidably engageable with the felly surface 14. The axially inner end of the horizontal leg 26 terminates in an axially inner, radially outer, axially inclined conical face or mounting surface 28 for wedging engagement with the mounting surface 30 on rim 10. The conical face 28 is beveled at a standard clamping angle: e.g., approximately 28°, as shown.

The improved rim 10 comprises an annular axially outer base member 35 and an annular axially inner ring member 36. The axially outer edge member of ring 36 is telescopically received over the axially inner edge of the base member 35. The telescopic end or interlocking portion 38 of the base member (hence, base interlocking portion) 35 presents the radially innermost surface 39 of rim 10 which is annularly continuous for seating against the felly surfaces 14 of the wheel 11.

The axially inner side of the interlocking portion 38 is radially oriented at a suitable angle to provide an angularly continuous stop surface 40 for mating engagement with the machined stop surface 16 on each spoke flange 15.

The radially inner, axially outer side of the base interlocking portion 38 is defined by the axially inclined mounting surface 30 wedgingly engaged by the clamp lug 20, as described above.

The radially outer surface 41 of base interlocking portion 38 provides an annular substantially axially oriented cylindrical surface over which the interlocking portion 42 of ring member 36 is telescopically received. An annular seat or groove 43 is formed in surface 41. While groove 43 is preferably semi-circular in cross-sectional profile to receive an O-ring 44, as will be more fully hereinafter described, it could well be of any cross section suitable to receive an adequate sealing means.

Displaced axially inwardly from groove 43, that is, between the groove 43 and the stop surface 40, the base interlocking portion 38 forms an annular hook 45. The axially inner face of hook 45 is stop surface 40. The radially outer surface 46 of hook 45 is parallel to and displaced radially inwardly of annular surface 41. The third side of hook 45 is the axially outer radially oriented surface 48 which terminates at the base 49 of the recess 50 between the hook 45 and the remainder of the base interlocking portion 38.

A radially inclined bridge 51 extends axially outwardly from interlocking portion 38 terminating in the substantially axially disposed web 52. Axially outwardly of web 52 is the bead seating flange 53 which is axially inclined in either the standard 5° or the standard 15–20° taper for the actual seating of the tire bead. The axially outer edge of the base member 35 of rim 10 then terminates in a side or gutter flange 54 for confining the outer bead of the tire mounted on rim 10.

The ring member 36 of rim 10 has a similar side or gutter flange 56 which extends radially outwardly from an axially inclined bead seating flange 58, also tapered at the standard 5° or 15–20°. A web 59 extends between the bead seating flange 58 and the interlocking portion 42 of ring member 36. The interlocking portion 42 is connected to the web 59 by a radially inclined bridge 60, the radially inner bend of which forms a shoulder or engaging ridge 61 as it joins the axially disposed sealing arm 62. The axially outer edge of sealing arm 62 terminates in a radially inturned lip 63 which provides an arcuate fillet 64 between the lip 63 and the arm 62.

A split locking ring 68 is selectively positionable between the interlocking portions, telescoped base member 35 and ring member 36, respectively, to lock them together. The locking ring 68 is generally heart-shaped in cross section. The right angular cleavage between the two lobes 69 and 70 of the heart-shaped locking ring 68 is formed by the two perpendicularly intersecting surfaces 71 and 72 which engage the radially outer and axially outer surfaces 46 and 48, respectively, of hook 45 on base interlocking portion 38.

The truncated base 73 is in the heart-shaped locking ring 68 is disposed generally perpendicularly to the bisector of the right angle formed between the cleavage surfaces 71 and 72, and engages the mating shoulder or engaging ridge 61 on ring interlocking portion 42.

By the structural concept heretofore described, when there is no tire mounted on the rim, or a deflated tire is on the rim, the interfitting edge portion 38 of the base member 35 can be telescoped into the edge portion 42 of the ring member 36 sufficiently far to permit the split locking ring 68 to be removed from between the portions 38 and 42. The axial dimension between the axially outer edge of lip 63 and bridge 51 together with the radial dimension between the radially outer face 46 on hook 45 and the web 59 of member 36 permit the split locking ring 68 to be so removed.

Conversely, after a tire has been positioned on the base member 35 the interlocking portion 42 of ring member 36 can be telescopically inserted over the interlocking portion 38 of the base member 35 and the split locking ring 68 inserted into the operative position shown. As the tire is inflated the air pressure imparts oppositely directed, generally axial, thrust forces against members 35 and 36 of the rim which are imparted to the locking ring 68 through the truncated base 73 by ring member 36 and through surfaces 71 and 72 by base member 35, thus wedgingly locking the sections together radially and axially by the radial and axial vectors of the force system established by the relationship of the structural elements of the rim members and locking ring.

The O-ring 44 is partially crushed between its seat in groove 43 in interfitting portion 38 of the base member 35 and the fillet 64 at the base of lip 63 on interfitting portion 42 of ring member 36 to provide an annular air impervious seal between the two members of the rim 11. However, all the stresses between the sections are transmitted solely through the rigid cross section of the locking ring. O-ring 44 thus performs only a sealing function and of course can be eliminated if a tubed tire is mounted instead of a tubeless tire.

Moreover, the present concept permits interlocking of the multiple parts of the split rim medially of the side flanges so that a rim for mounting wide bead tires: i.e., a rim having an axial dimension of at least 11.25 inches between gutter flanges 54 and 56, may be manufactured from stock rolled in existing rolling mills without the need for rolling adjacent sections and then welding them together. In other words, members 35 and 36 can be separately and integrally rolled and selectively joined together, as described above, to accomplish the objects of the invention

What is claimed is:

1. A method for the manufacture of a rim for mounting wide base tires comprising the steps of rolling and profiling mill stock to provide a gutter flange on one edge and a hooked interfitting portion on the other edge, cutting said mill stock into lengths, joining the ends of said cut lengths to form a base member, rolling and profiling a second mill stock to provide a gutter flange on one edge and an engaging shouldered interfitting portion on the outer edge, cutting said second mill stock into lengths, joining the ends of the cut lengths of said second mill stock to form a ring member, telescoping the interfitting portion of said ring member over the interfitting portion of said base member, inserting a split locking ring between said hooked interfitting portion and said engaging shouldered interfitting portion.

2. A method for the manufacture of rims for mounting wide bead tires having an axial dimension of at least 11.25 inches, comprising the steps of rolling and profiling mill stock to provide a gutter flange on one edge and an interfitting portion on the other edge, said interfitting portion having a hook, cutting said mill stock into lengths, joining the ends of said cut length to form a base member such that said gutter flange and hook are radially outwardly directed, rolling and profiling a second mill stock to provide a gutter flange on one edge and an interfitting portion on the other edge, the interfitting portion on said second mill stock having an engaging shoulder, cutting said second mill stock into lengths, joining the ends of the cut lengths of said second mill stock to form a ring member such that said gutter flange is radially outwardly directed and said engaging shoulder is radially inwardly directed, telescoping the interfitting portion of said ring member over the interfitting portion of said base member, inserting a locking ring between said hook and shoulder of said interfitting portions.

3. A method for the manufacture and assembly of rims having an axial dimension of at least 11.25 inches suitable for mounting wide bead tires, comprising the steps of: rolling a first section of mill stock to provide a gutter flange on one edge and an interfitting hook portion on the other edge, cutting said first section of rolled mill stock to length, hooping and joining the ends of said rolled and cut stock to form a rim base member with said gutter flange and interfitting hook portion directed radially outwardly, rolling a second section of mill stock to provide a gutter flange on one edge and an interfitting shoulder portion on the other edge, cutting said second section of rolled mill stock to length, hooping and joining the ends of said rolled and cut stock to form a rim ring member with said gutter flange directed radially outwardly and said interfitting shoulder portion disposed radially inwardly, telescoping the interfitting shoulder portion of said ring member over the interfitting hook portion of said base member to an interfitting position generally axially medially of said gutter flanges of said base and ring members, and inserting a split locking ring between said hook and shoulder portions.

4. A method for the manufacture and assembly of rims having an axial dimension greater than 11.25 inches and suitable for mounting wide bead tires comprising the steps of:

(a) simultaneously finish-rolling and profiling a first section of mill stock to provide a gutter flange 54 on one edge and an interfitting hook portion 38 on the other edge, (b) cutting first section of rolled and profiled stock to length, (c) hooping and joining the ends of said first stock to form a rim base member 35 with said gutter flange 54 and interfitting hook portion 38 directed radially outwardly, (d) simultaneously finish-rolling and profiling a second section of mill stock to provide a gutter flange 56 on one edge and an interfitting shoulder portion 42 on the other edge, (e) cutting said second section of rolled and profiled stock to length, (f) hooping and joining the ends of said second stock to form a rim ring member 36 with said gutter flange 56 directed radially outwardly and said interfitting shoulder portion 42 disposed radially inwardly.

(g) axially telescoping the interfitting shoulder portion 42 of said ring member 36 radially over the interfitting hook portion 38 of said base member 35 to an interfitting position generally axially medially of said base member gutter flange 54 and said ring member gutter flange 56, (h) inserting a sealing means 44 radially between said shoulder portion 42 and said hook portion 38, and (i) inserting a split locking ring 68 radially between said hook and shoulder portions and adjacent and axially inwardly of said sealing means 44.

References Cited by the Examiner

UNITED STATES PATENTS

| | | | |
|---|---|---|---|
| 2,291,394 | 7/1942 | Le Jeune | 29—159.1 |
| 2,548,627 | 4/1951 | Sinclair | 152—410 |
| 2,808,870 | 10/1957 | Riggs | 152—410 |
| 2,810,419 | 10/1957 | Woodward | 152—410 |
| 2,825,961 | 3/1958 | Woodward | 29—159.1 |
| 3,009,501 | 11/1961 | Lemmerz | 152—410 |

FOREIGN PATENTS 643,547  9/1950  Great Britain.

JOHN F. CAMPBELL, *Primary Examiner.*

ROBERT C. RIORDON, THOMAS H. EAGER,
*Examiners.*